United States Patent Office 3,803,258
Patented Apr. 9, 1974

3,803,258
PRODUCTION OF PURE CONJUGATED $C_4$ AND $C_5$ DIOLEFINS FROM HYDROCARBON MIXTURES
Hans-Martin Weitz, Frankenthal, and Ernst Fuerst, Neustadt, Germany, assignors to Badische Anilin- & Soda-Fabrik Aktiengesellschaft, Ludwigshafen (Rhine), Germany
Filed Nov. 21, 1972, Ser. No. 308,518
Int. Cl. C07c 7/08, 7/10
U.S. Cl. 260—681.5 R    16 Claims

ABSTRACT OF THE DISCLOSURE

Production of pure conjugated $C_4$ and $C_5$ diolefins from hydrocarbon mixtures containing the same by extractive distillation, countercurrent gas scrubbing, liquid-liquid extraction or countercurrent distillation or a combination of two or more of these methods using as the selective solvent a mixture of: (a) from 5 to 95% by weight of an N-alkylpyrrolidone which may contain an inert substituent; and (b) from 5 to 95% by weight of a N-hydroxyalkyl Compound I of the general formula:

Figure 1:
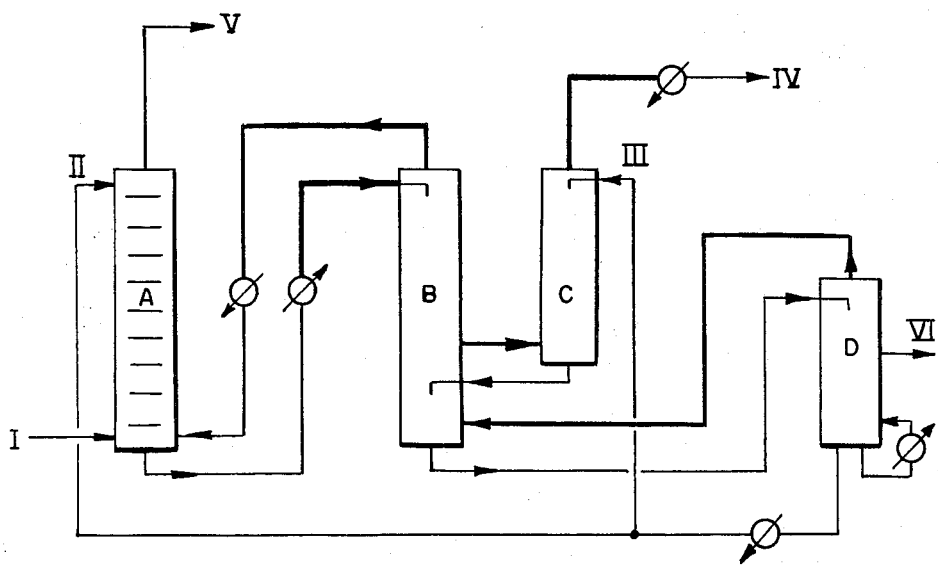

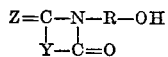
(I)

in which Y is alkylene or alkenyl of two or three carbon atoms or an o-phenylene which may be wholly or partly hydrogenated; R is linear or branched alkylene; and Z is oxygen or two hydrogens, and which may contain an inert substituent.

---

This invention relates to a process for the production of pure conjugated $C_4$ and $C_5$ diolefins from hydrocarbon mixtures containing these compounds by extractive distillation, countercurrent gas scrubbing, liquid-liquid extraction or countercurrent distribution or a combination of two or more of these methods using a selective solvent.

Conjugated $C_4$ and $C_5$ diolefins such as butadiene, isoprene, cyclopentadiene and pentadienes-1,3 are known to be important starting materials for the production of plastics and elastomers and also for the production of valuable chemical intermediates.

For the recovery of the said diolefins it is preferred at the present time to use $C_4$ and $C_5$ hydrocarbon mixtures such as are obtained for example in the production of ethylene by pyrolysis of hydrocarbons such as gasoline or gas oil or in the dehydrogenation of appropriate paraffins and/or olefins. Since the desired diolefins are always obtained as mixtures with other hydrocarbons in the said methods it is necessary to separate them from the contaminants to recover the pure diolefins. Treatment of the $C_4$ and $C_5$ hydrocarbon mixtures with a selective solvent has proved to be particularly suitable for the recovery of the diolefins. A large number of selective solvents has already been described for the separation of $C_4$ and $C_5$ hydrocarbon mixtures containing diolefins, examples being aqueous copper ammonium acetate solution and organic solvents such as acetonitrile, furfurol, dimethyl acetamide, dimethylformamide and aqueous N-methylpyrrolidone.

The use of these solvents is not satisfactory however in all cases. In particular, when prior art selective solvents are used it is often not possible to remove to an adequate extent by boiling the compounds which are better soluble in the selective solvent in the treatment of the hydrocarbon mixture. For example when isoprene is to be recovered from a $C_5$ cut containing cyclopentadiene by treatment with a selective solvent in the very high purity required for polymerization, it is essential for the achievement of a very low level of cyclopentadiene in the isoprene, for example a cyclopentadiene level of not more than 1 p.p.m., that the selective solvent used for separating cyclopentadiene and the linear $C_5$ diolefins from the isoprene should be freed down to traces, for example down to a content of not more than 10 p.p.m., of monomeric and dimeric cyclopentadiene by boiling out the components of good solubility. It is only if the monomeric and dimeric cyclopentadiene has been removed practically completely from the selective solvent used for the treatment of the hydrocarbon mixture that it can be used again for the treatment of the hydrocarbon mixture because it is only with a selective solvent practically devoid of monomeric and dimeric cyclopentadiene that the separation of an isoprene having the necessary low content of monomeric and dimeric cyclopentadiene is possible. Prior art organic selective solvents in anhydrous form or after the addition of water usually necessary in such separations have boiling points which are below or only slightly above the boiling point of cyclopentadiene. When using the said selective solvent however it is practically impossible to remove to an adequate extent from the solvent by boiling out the dicyclopentadiene dissolved in the selective solvent in the treatment of $C_5$ cuts.

Another disadvantage of the prior art organic selective solvents—which usually are used mixed with water to increase selectivity—is that they provide only inadequate separation of components having good solubility in the extractant when these components are present in the hydrocarbon feedstock in high concentration. Instead of the desired phase separation in liquid-liquid extraction into a layer of solvent loaded with the components of good solubility and a layer with the components having lower solubility in the solvent, there separates a fairly small layer having a very high water content when the prior art selective solvents are used, whereas the hydrocarbons to be separated remain together in a second very large layer.

It is an object of the invention to provide a process for the recovery of pure conjugated $C_4$ and $C_5$ diolefins from hydrocarbon mixtures containing the same which does not have the above-mentioned disadvantages of prior art methods.

In accordance with this invention this and other objects and advantages are achieved in a process for the recovery of pure conjugated $C_4$ and $C_5$ diolefins from hydrocarbon mixtures containing the same by extractive distillation, countercurrent gas scrubbing, liquid-liquid extraction, countercurrent distribution or a combination of two or more of these methods using a selective solvent wherein there is used as mixture of:

(a) From 5 to 95% by weight of an N-alkylpyrrolidone which may contain an inert substituent; and
(b) From 5 to 95% by weight of a N-hydroxyalkyl Compound I of the general formula:

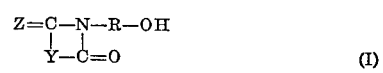
(I)

in which

Y is alkylene or alkenyl of two or three carbon atoms or o-phenylene which may be wholly or partly hydrogenated;
R is linear or branched alkylene; and
Z is an oxygen atom or two hydrogen atoms, and which may contain an inert substituent.

The N-alkylpyrrolidones to be used according to the invention preferably contain up to fifteen, particularly up to ten, carbon atoms. The N-alkylpyrrolidones may bear inert substituents. Examples of suitable substituents of the heterocyclic ring are alkyl groups such as methyl, ethyl, isopropyl or butyl groups. The alkyl groups on the ring nitrogen may contain as inert substituents for example lower alkoxy groups such as alkoxy groups of up to four carbon atoms, halogen atoms, for example chlorine or bromine atoms, amino groups, alkylamino groups, for example methyl or ethyl substituted alkylamino groups, and dialkylamino groups, for example dimethylamino or diethylamino groups. Examples of suitable N-alkylpyrrolidones are N-(β-aminoethyl)-pyrrolidone, N-(β-methoxyethyl)-pyrrolidone, N-(β-chloroethyl)-pyrrolidone, N - (β-dimethylaminoethyl)-pyrrolidone, N-methylpyrrolidone, and N-butylpyrrolidone. It is particularly advantageous to use N-methylpyrrolidone.

The alkylene groups R in the N-hydroxyalkyl compounds of the General Formula I generally contain from two to twelve, preferably from two to six, and particularly two, carbon atoms. The N-hydroxyalkyl compounds may contain inert substituents, for example alkyl groups such as methyl, ethyl, isopropyl or butyl groups on the methylene groups of the ring or rings. Examples of suitable N-hydroxyalkyl compounds are N-hydroxyalkylpyrrolidones, N - hydroxyalkylmaleimides, N - hydroxylalkylsuccinimides, N-hydroxyalkylglutarimides, N-hydroxyalkylphthalimides and N - hydroxyalkyltetrahydrophthalimides. It is preferred to use N-hydroxyethylphthalimide, N-hydroxyethylsuccinimide and particularly N-hydroxyethylpyrrolidone. A mixture of two or more than two N-hydroxyalkyl compounds may be used instead of one N-hydroxyalkyl compound. The concentration of N-methylpyrrolidone in the mixtures to be used according to the invention is from 5 to 95% by weight, preferably from 10 to 90% and particularly from 30 to 70% by weight. Accordingly the concentration of the N-hydroxyalkyl Compound I in the mixtures is from 5 to 95% by weight, preferably from 10 to 90% and particularly 30 to 70% by weight.

It may be advantageous to use a mixture of an N-alkylpyrrolidone and a N-hydroxyalkyl Compound I which also contains some water. The amount of water added to the mixture of solvents is preferably from 1 to 25, particularly from 2 to 15%, by weight based on the solvent mixture.

In the mixture of solvents according to the invention the boiling point may be varied within wide limits by suitable choice of the relative proportions without any appreciable impairment of the solvent power of the system. It is thus possible to set up in convenient fashion in the mixture of N-alkylpyrrolidone and N-hydroxyalkyl Compound I the boiling temperature necessary for boiling off compounds of good solubility from the selective solvent in the treatment of the hydrocarbon mixture without the selectivity and solvent power of the system being appreciably altered. Another advantage of the new solvent system is that when it is used in liquid-liquid extraction for the separation of the hydrocarbon mixture two liquid phases are obtained.

Butadiene, isoprene, the pentadienes-1,3 and cyclopentadiene are preferred as conjugated $C_4$ and $C_5$ diolefins which can be recovered by the new method. All hydrocarbon mixtures which contain the said conjugated $C_4$ and $C_5$ diolefins are suitable as starting materials for the recovery of these diolefins. Examples of suitable starting materials are $C_4$ and $C_5$ hydrocarbon cuts which have been obtained in the known pyrolytic method for the recovery of ethylene from hydrocarbons, for example in the recovery of ethylene from gasoline and gas oil in tubular reactors in the presence of steam. Hydrocarbon mixtures containing conjugated diolefins which have been obtained in the dehydrogenation, in the presence or absence of oxygen, of appropriate $C_4$ and/or $C_5$ hydrocarbons or hydrocarbon mixtures are also suitable as feedstocks. Apart from butadiene, the $C_4$ hydrocarbon feedstocks as a rule contain higher acetylenes and allenes, butanes and large amounts of butenes. $C_5$ hydrocarbon feedstocks usually contain (in addition to isoprene and pentadienes-1,3) higher acetylenes and allenes, large amounts of pentanes and pentenes and also cyclopentadiene.

Separation of the hydrocarbon feedstocks is carried out by extractive distillation, countercurrent gas scrubbing, liquid-liquid extraction, countercurrent distribution or a combination of two or more of these methods using the solvent mixtures to be used according to the invention as selective solvents. Separation of hydrocarbon feedstocks containing conjugated $C_4$ and $C_5$ diolefins by means of the said methods using a selective solvent is known per se and is described for example in German Pats. 1,059,436, 1,163,795 and 1,184,334. The use of liquid-liquid extraction or the combination of liquid-liquid extraction and extractive distillation for the separation of hydrocarbon feedstocks is described for example in Oil Gas Journal, vol. 65 (1967), part 2, pp. 98 et seq. Separation of hydrocarbon feedstocks by means of a selective solvent using countercurrent distribution is disclosed for example in Chimia, 12 (1958), pp. 239–240.

By means of the said methods of extractive distillation, countercurrent gas scrubbing, liquid-liquid extraction, countercurrent distribution or a suitable combination of two or more of these methods it is possible when using the solvent mixture to be employed according to the invention to recover the conjugated $C_4$ and $C_5$ diolefins from feedstocks containing them in a very pure form without the need for any additional treatment such as by selective catalytic hydrogenation.

The invention is further illustrated by the examples.

EXAMPLE 1

The feedstock is a $C_5$ hydrocarbon cut obtained in the cracking of naphtha in a naphtha cracker for the production of ethylene. It has the following composition determined by gas chromatography:

| | Percent by weight |
|---|---|
| n-Pentane+isopentane | 44.5 |
| Pentenes | 10.4 |
| Methylbutenes | 11.4 |
| Isoprene | 10.5 |
| Pentadienes-1,3 | 10.7 |
| Cyclopentadiene | 11.2 |
| Cyclopentane+cyclopentene | 1.1 |
| $C_5$ acetylenes and allenes, butyne-2 | 0.1 |
| $C_{6+}$ and other hydrocarbons | 0.1 |

In a separation plant as shown in FIG. 1 which operates on a combination of a liquid-liquid extraction and an extractive distillation using a mixture of N-methylpyrrolidone and N-hydroxyethylsuccinimide in the ratio of 1:1 by weight, a crude isoprene is recovered from the said mixture and after distillative separation of the cyclopentene it gives a pure isoprene of the following composition:

| | |
|---|---|
| Isoprene | More than 99.5% by weight. |
| Pentadienes-1,3 | Less than 200 p.p.m. |
| Cyclopentadiene | Less than 1 p.p.m. |
| Total acetylenes | Less than 50 p.p.m. |
| Total allenes | Less than 100 p.p.m. |

In FIG. 1 A is a mixer-settler battery having ten stages, B is a bubble tray column having a diameter of 30 mm. and sixty actual trays, C is a bubble tray column having a diameter of 30 mm. and 60 actual trays, D is a packed column having a diameter of 35 mm. and a height of 500 mm., I is a feed pipe for $C_5$ hydrocarbon feedstock, II is a feed pipe for solvent for the mixer-settler battery A, III is a feed pipe for solvent to column C, IV is the discharge of isoprene containing cyclopentene, V is the discharge of pentanes and pentenes and VI is the discharge of pentadienes-1,3, monomeric and dimeric cyclopentadiene, $C_5$ acetylenes, $C_5$ allenes and unsaturated $C_6$ and higher hydrocarbons.

The amount of $C_5$ hydrocarbon cut used for the separation is 300 ml./hour. 1200 ml./h. of the said solvent mixture is supplied to mixture-settler battery A and 750 ml./hour to column C.

The pentane-pentene stream withdrawn through line V from the mixer-settler battery still contains about 0.3% of isoprene, equivalent to a loss of isoprene of about 2%. All compounds having a higher solubility than isoprene in the solvent mixture (i.e. pentadienes-1,3, cyclopentadiene, $C_5$ acetylenes (for example methyl-butenyne), $C_5$ allenes (for example pentadiene-1,2) and small amounts of unsaturated $C_{6+}$ hydrocarbons) are withdrawn through line VI.

EXAMPLE 2

Figure 2:
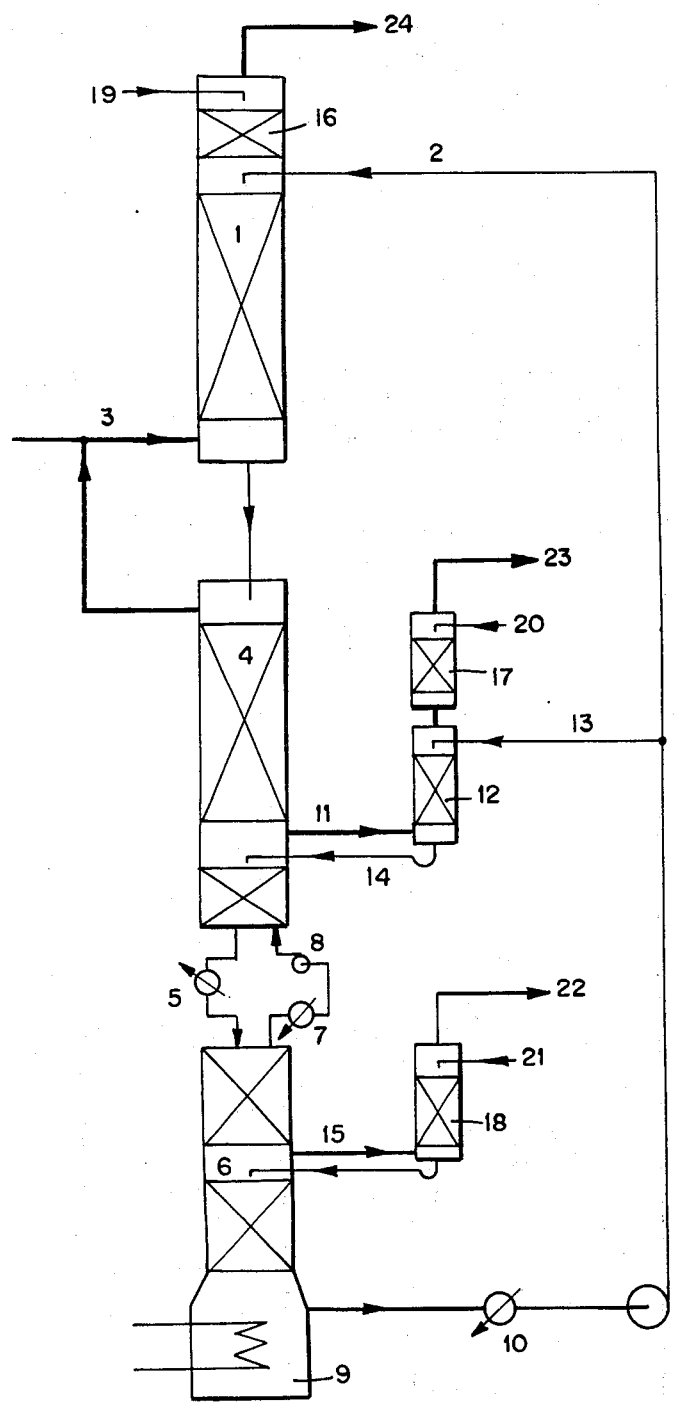

In an experimental plant for extractive distillation such as is shown diagrammatically in FIG. 2, 170 liters per hour of an aqueous mixture of N-methylpyrrolidone and N-β-hydroxyethylpyrrolidone (ratio by weight 1:1 with 2% by weight of water) is fed through line 2 into column 1 (a packed column having a length of 12 meters and a diameter of 25 cm.) which is under a pressure of about 3 atmospheres gauge. 10 cubic meters (STP) per hour of a gaseous crude $C_4$ cut such as is obtained in the pyrolysis of naphtha for the production of ethylene and which has the following analysis:

|  | Percent by volume |
| --- | --- |
| Propene+propylene | About 0.2 |
| Isobutane | 1.0 |
| N-butane | 4.7 |
| Isobutene | 23.5 |
| Butene-1 | 12.6 |
| Trans-butene-2 | 6.4 |
| Cis-butene-2 | 5.4 |
| Butadiene-1,3 | 44.6 |
| Propadiene | 0.1 |
| Butadiene-1,2 | 0.2 |
| Propyne | 0.3 |
| Butyne-1 | 0.2 |
| Vinylacetylene | 0.8 |
| Other hydrocarbons | Traces | is fed through line 3 into the bottoms of the said column. The solvent loaded with hydrocarbons obtained in the bottoms of column 1 is passed to the top of a column 4 (having the same dimensions as column 1), the gas mixture obtained at the head of this column is mixed with the gaseous feedstock and fed through line 3 into the bottoms of column 1. The solvent loaded with hydrocarbons obtained in the bottoms of column 4 is heated in a heater 5 and supplied to column 6 (length 6 meters, diameter 30 cm., operating pressure 0.5 atmosphere gauge), the gas mixture obtained at the head of this column is cooled in cooler 7, compressed in compressor 8 to the pressure of column 4 and fed into the bottoms of the column 4. The solvent obtained in the bottoms of column 6 is boiled by means of a heating coil 9 (and thus completely degassed); the solvent is cooled in cooler 10 and used again for the separation process. A crude butadiene is withdrawn through a lateral outlet 11 in the lower third of column 4. This crude butadiene is freed from $C_4$ acetylene, butadiene-1,2 and some of the propyne (i.e. from hydrocarbons having a greater solubility than butadiene-1,3 in the selective solvent) in a stripper 12 (length 10 meters, diameter 10 cm.) by washing with a slip stream of solvent which has been degassed (70 liters per hour supplied to the top of this column through line 13). The solvent loaded with hydrocarbons obtained in the bottoms of this column 12 is introduced at the level of the lateral outlet 11 into column 4 through line 14. These more soluble hydrocarbons accumulate at about the middle of column 6 where they are withdrawn from the system through a lateral outlet 15 together with a small amount of butadiene-1,3.

All hydrocarbon streams leaving the system in the gas phase are freed from solvent vapor entrained in accordance with the partial pressure in washing stages 16, 17 and 18 with a small amount of water supplied through lines 19, 20 and 21. An amount of water vapor equivalent to the sum of these amounts of water fed in is withdrawn through line 22 at the top of washing stage 18 together with the hydrocarbons of greater solubility. After residual amounts of propyne have been separated by distillation from the product butadiene withdrawn through line 17 from the top of washing stage 17, gas chromatographic analysis shows it to have a purity of more than 99.9 vol. percent with a content of $C_4$ acetylene of less than 10 p.p.m. and a content of butadiene-1,2 of less than 25 p.pm. The mixture of butane and butene obtained at the top of washing stage 16 contains less than 1% of butadiene-1,3.

EXAMPLE 3

The separation is carried out in the apparatus described in Example 2 with the $C_4$ cut described in the said example at the rate of 10 cubic meters (STP) per hour. The selective solvent used (a mixture of N-hydroxyethylphthalimide and N-hydroxyisopropyl-pyrrolidone in the ratio by weight 1:1.5 with 1% by weight of water) is supplied in an amount of 200 liters per hour to column 1 and in an amount of 80 liters per hour to column 17. The purity of the product butadiene obtained is more than 99.8% by volume, the content of $C_4$ acetylenes is less than 15 p.p.m. and the content of butadiene-1,2 is less than 40 p.p.m.

We claim:

1. A process for the production of pure conjugated $C_4$ and $C_5$ diolefins from hydrocarbon mixtures containing these compounds by extractive distillation, countercurrent gas scrubbing, liquid-liquid extraction or countercurrent distribution or a combination of two or more of these methods using a selective solvent, wherein there is used as the selective solvent a mixture of:
   (a) from 5 to 95% by weight of an N-alkylpyrrolidone which may contain an inert substituent; and
   (b) from 5 to 95% by weight of an N-hydroxyalkyl Compound I of the general formula:

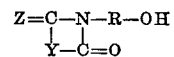

(I)

in which
   Y is alkylene or alkenyl of two or three carbon atoms or o-phenylene which may be wholly or partly hydrogenated;
   R is a linear or branched alkylene; and
   Z is oxygen or two hydrogens;
and which may contain an inert substituent.

2. A process as claimed in claim 1 wherein component (a) has up to fifteen carbon atoms.

3. A process as claimed in claim 1 wherein component (a) has up to ten carbon atoms.

4. A process as claimed in claim 1 wherein component (a) is N-methylpyrrolidone.

5. A process as claimed in claim 1 wherein the alkylene group R in component (b) contains from two to twelve carbon atoms.

6. A process as claimed in claim 5 wherein the alkylene group R contains from two to six carbon atoms.

7. A process as claimed in claim 5 wherein the alkylene group R contains two carbon atoms.

8. A process as claimed in claim 1 wherein component (b) is N-hydroxyethylphthalimide or N-hydroxyethylsuccinimide.

9. A process as claimed in claim 1 wherein component (b) is N-hydroxyethylpyrrolidone.

10. A process as claimed in claim 1 wherein the solvent mixture comprises from 10 to 90% by weight of (a) and from 10 to 90% by weight of (b).

11. A process as claimed in claim 10 wherein the solvent mixture comprises from 30 to 70% by weight of (a) and from 30 to 70% by weight of (b).

12. A process as claimed in claim 1 wherein the solvent mixture contains water.

13. A process as claimed in claim 12 wherein the solvent mixture contains from 1 to 25% by weight of water based on the solvent mixture.

14. A process as claimed in claim 1 wherein the solvent mixture contains from 2 to 15% by weight of water based on the solvent mixture.

15. A process as claimed in claim 1 wherein the conjugated $C_4$ or $C_5$ diolefin recovered is butadiene, isoprene or a pentadiene-1,3 or cyclopentadiene.

16. A process as claimed in claim 1 wherein the hydrocarbon feedstock is a $C_4$ or $C_5$ cut obtained in the pyrolytic synthesis of ethylene from hydrocarbons.

References Cited

UNITED STATES PATENTS

| | | | |
|---|---|---|---|
| 3,320,138 | 5/1967 | Brandt et al. | 260—681.5 |
| 3,344,198 | 9/1967 | Weitz et al. | 260—681.5 |
| 3,496,069 | 2/1970 | Tschopp et al. | 260—681.5 |
| 3,496,070 | 2/1970 | Woerner et al. | 260—681.5 |
| 3,510,405 | 5/1970 | Takao et al. | 260—681.5 |
| 3,515,762 | 6/1970 | Koide et al. | 260—681.5 |
| 3,600,454 | 8/1971 | Jhawar | 260—681.5 |

PAUL M. COUGHLAN, Jr., Primary Examiner

U.S. Cl. X.R.

203—51, 58; 260—666 A

UNITED STATES PATENT OFFICE
CERTIFICATE OF CORRECTION

Patent No. 3,803,258　　　　　　　　　Dated April 9, 1974

Inventor(s) Hans-Martin Weitz et al.

It is certified that error appears in the above-identified patent and that said Letters Patent are hereby corrected as shown below:

Column 1, line 9, insert
-- 30　　Foreign Application Priority Data
　　November 26, 1971　　Germany . . . P 21 58 609.4 --.

Column 1, line 17, "distillation" should read -- distribution --

Column 5, line 22, insert -- the top of a -- before "column ".

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents